US012466095B2

(12) United States Patent
Tang

(10) Patent No.: US 12,466,095 B2
(45) Date of Patent: Nov. 11, 2025

(54) PAPER CUTTER

(71) Applicant: Haoliang Tang, Shenzhen (CN)

(72) Inventor: Haoliang Tang, Shenzhen (CN)

(*) Notice: Subject to any disclaimer, the term of this patent is extended or adjusted under 35 U.S.C. 154(b) by 159 days.

(21) Appl. No.: 18/397,006

(22) Filed: Dec. 27, 2023

(65) Prior Publication Data

US 2025/0214269 A1 Jul. 3, 2025

(51) Int. Cl.
*B26B 27/00* (2006.01)

(52) U.S. Cl.
CPC .................................... *B26B 27/00* (2013.01)

(58) Field of Classification Search
CPC ...................................................... B26B 27/00
See application file for complete search history.

(56) References Cited

U.S. PATENT DOCUMENTS

| | | | | |
|---|---|---|---|---|
| 4,001,934 A * | 1/1977 | Bell | B26B 27/00 | 30/294 |
| 5,025,585 A * | 6/1991 | Powell | A01K 97/00 | 43/25 |
| D890,591 S * | 7/2020 | Lei | B26B 27/00 | D8/98 |
| D968,190 S * | 11/2022 | Tang | B26B 27/00 | D8/98 |
| 11,717,977 B1 * | 8/2023 | Xie | B26B 3/08 | 30/278 |
| D1,018,662 S * | 3/2024 | Perla | B26B 27/00 | D8/98 |
| D1,029,091 S * | 5/2024 | Gan | B26B 27/00 | D8/98 |
| 12,091,276 B1 * | 9/2024 | Liu | B26B 29/06 | |
| D1,053,693 S * | 12/2024 | Zhou | B26B 27/00 | D8/98 |
| D1,082,483 S * | 7/2025 | Tu | B26B 27/00 | D8/98 |
| 2015/0059188 A1 * | 3/2015 | Haas | B26B 3/08 | 30/279.2 |
| 2018/0345516 A1 * | 12/2018 | Perla | B26D 1/045 | |
| 2025/0019199 A1 * | 1/2025 | Liu | B65H 35/06 | |

* cited by examiner

*Primary Examiner* — Sean M Michalski

(57) ABSTRACT

A paper cutter is disclosed, including a barrel. The barrel is configured with an opening on one side, and a bottom of the opening is configured to be mounted with a removable blade. The removable blade is composed of a detachable base, a paper guiding slot and a blade. The paper guiding slot is configured on a top of the detachable base, the blade is mounted on an inside of the paper guiding slot at an oblique angle, and the barrel is configured with a groove on an inside wall. The present disclosure belongs to the technical field of a cutting device for paper products, specifically refers to a paper cutter, it is easy to replace blade accessories, the removable blade is placed separately to ensure that there is no exposure and also can ensure safety. The paper cutter also has high cutting efficiency and a flat cutting surface.

4 Claims, 3 Drawing Sheets

PAPER CUTTER

TECHNICAL FIELD

The present application relates to the technical field of a cutting device for paper products, and in particular to a novelty paper cutter.

BACKGROUND

Roll paper is a kind of paper commonly used in people's work and life. In order to meet different conditions of use, it is usually necessary to cut the paper into different lengths according to actual needs.

Currently, people mainly use scissors or blades to cut paper rolls, however use of scissors or blades to cut paper rolls is relatively low efficiency, and cutting edges is often uneven, resulting in waste of inferior products. In addition, the use of scissors or blades is less safe, especially when the scissors or blades are exposed to children, who are likely to be at risk.

SUMMARY

The present disclosure aims to provide a novelty paper cutter to address above problems, which is easy to replace blade accessories, and a removable blade is placed separately to ensure that there is no exposure and also can ensure safety. Moreover, the paper cutter also has high cutting efficiency and a flat cutting surface.

To achieve above objectives, the present disclosure adopts following technical solutions. In some embodiments of the present disclosure, a paper cutter is provided, including a barrel. Herein the barrel is configured with an opening on one side, and a bottom of the opening is configured to be mounted with a removable blade. The removable blade is composed of a detachable base, a paper guiding slot and a blade. The paper guiding slot is configured on a top of the detachable base, the blade is mounted on an inside of the paper guiding slot at an oblique angle, and the barrel is configured with a groove on an inside wall.

In some preferred embodiments of the present disclosure, the groove is positioned with respect to the opening and the barrel is made of elastic materials.

In some preferred embodiments of the present disclosure, an outer side wall of the barrel is uniformly configured with non-slip fillets.

In some preferred embodiments of the present disclosure, a locking lug is arranged on a bottom of a side of the detachable base, a locking block is arranged on a bottom of the barrel, and the locking lug is configured to be fitted with the locking block.

Compared with existing technologies, the present disclosure has at least following advantages and beneficial effects by adopting above structures. With providing the removable blade, which is easy to disassemble and replace, and the removable blade can be placed separately to ensure that there is no exposure and also ensure safety. Moreover, with disposing the blade on the inside of the paper guiding slot at the oblique angle, which can ensure that the paper to be cut is guided to an intersection of the blade and the paper guiding slot and adheres to the paper guiding slot, so that an angle between the paper and the blade can be kept fixed when cutting, making it easier to cut the paper.

Figure 1:
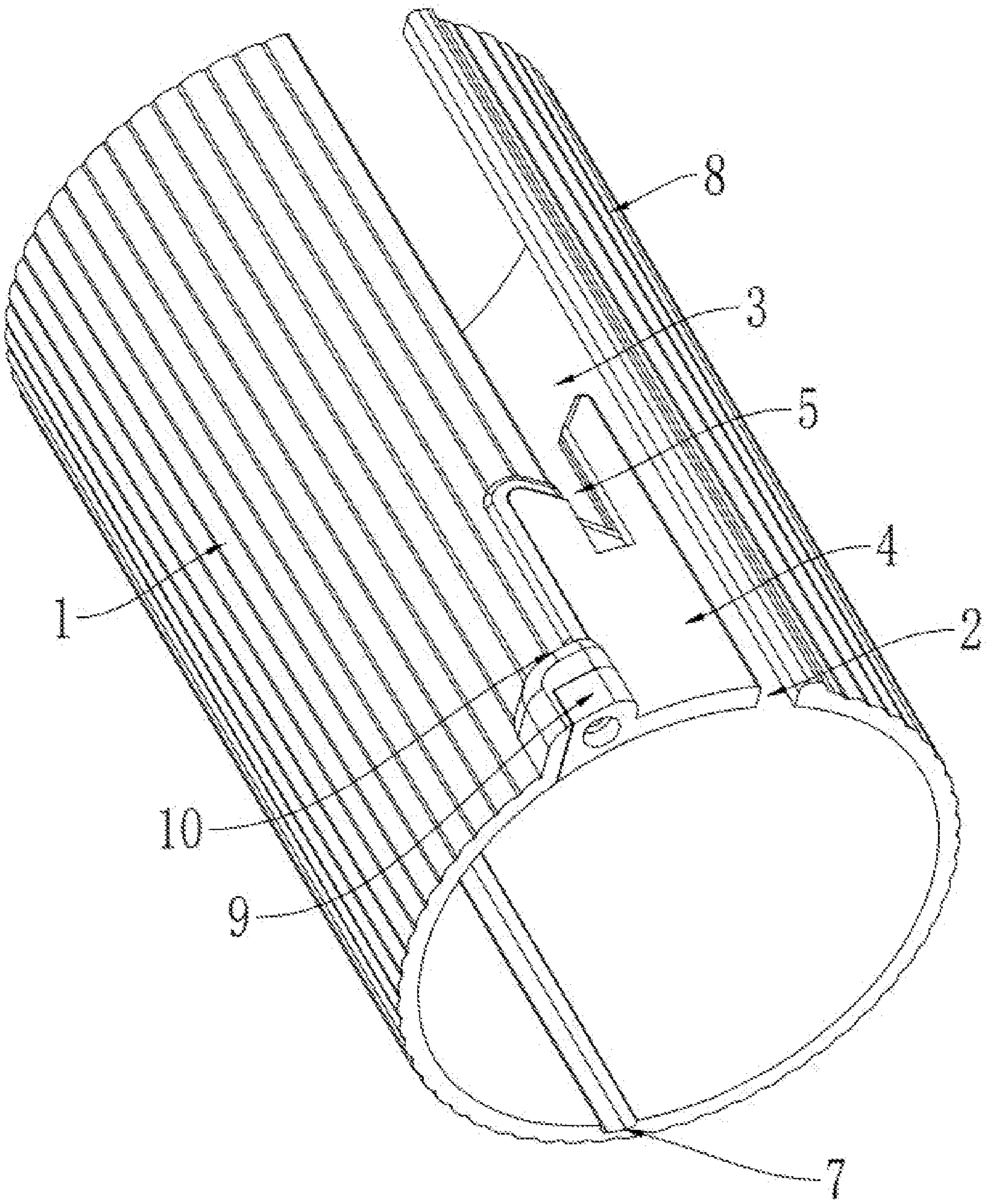
FIG. 1 shows an overall structural schematic diagram of a paper cutter in accordance with some embodiments of the present disclosure.

In the drawings, reference signs are as follows. 1. barrel, 2. opening, 3. removable blade, 4. detachable base, 5. paper guiding slot, 6. blade, 7. groove, 8. non-slip fillets, 9. locking lug, 10. locking block.

DETAILED DESCRIPTION OF THE EMBODIMENTS

The technical solutions of the present disclosure will be described clearly and completely below in conjunction with accompanying drawings, and it is obvious that all described embodiments are a part of embodiments of the present disclosure and not all of the embodiments. Based on the embodiments in the present disclosure, all other embodiments obtained by a person of ordinary skill in the art without making creative labor fall within the scope of protection of the present invention.

In the description of the present disclosure, it is to be noted that terms "center", "top", "bottom", "left", "right", "vertical", "horizontal", "inside", "outside", and the like indicate orientations or positional relationships based on those shown in the accompanying drawings, and are only intended to facilitate the description of the present disclosure and to simplify the description, and do not indicate or imply that a device or an element referred to must have a particular orientation, be constructed and operated in a particular orientation, and therefore, cannot be construed as a limitation of the present disclosure. Furthermore, terms "first", "second", and "third" are used for descriptive purposes only and are not to be understood as indicating or implying relative importance. The present disclosure is described in further detail hereinafter in conjunction the accompanying drawings.

Figure 2:
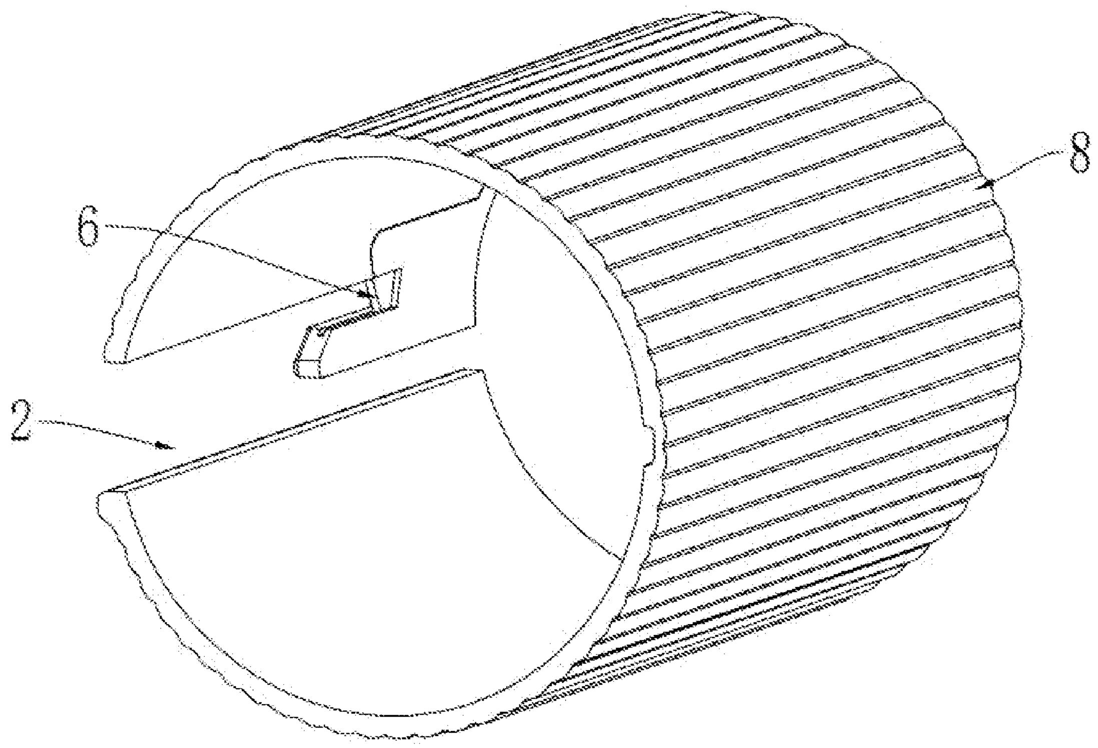
FIG. 2 shows an overall structural schematic diagram from another angle of the paper cutter in accordance with some embodiments of the present disclosure.
Figure 3:
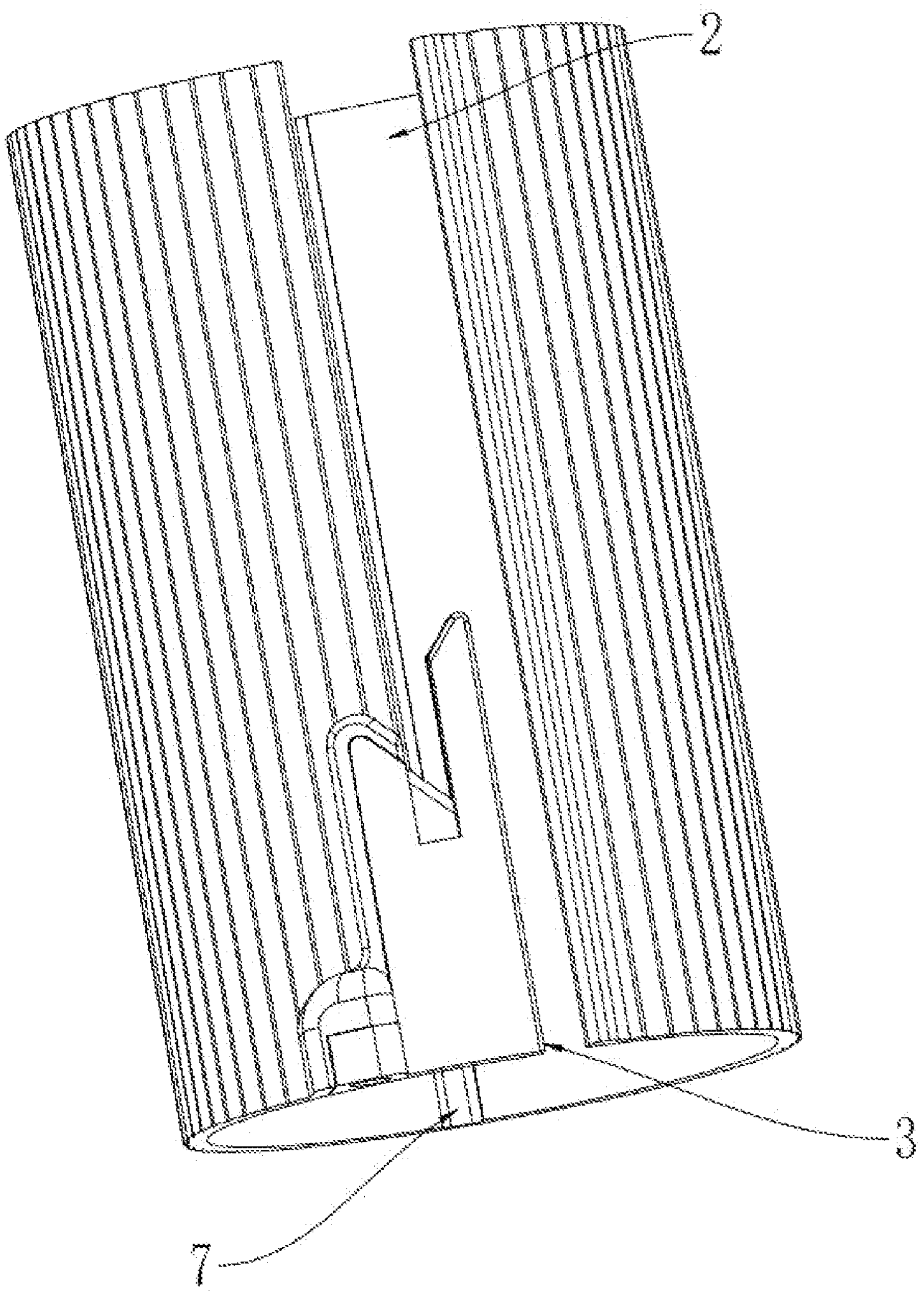
FIG. 3 shows an overall structural schematic diagram from still another angle of the paper cutter in accordance with some embodiments of the present disclosure.

Referring to FIG. 1 to FIG. 3, in some embodiments of the present disclosure, a paper cutter is provided, including a barrel 1. Herein the barrel 1 is configured with an opening 2 on one side, the opening 2 is convenient for a case that the barrel 1 sleeved on a paper drum can be pulled to adjust a length of a paper to be cut. A bottom of the opening 2 is configured to be mounted with a removable blade 3 for easy disassembly and replacement, and the removable blade 3 is placed separately, which can ensure no exposure and safety. The removable blade 3 is composed of a detachable base 4, a paper guiding slot 5 and a blade 6. The paper guiding slot 5 is configured on a top of the detachable base 4, the blade 6 is mounted on an inside of the paper guiding slot 5 at an oblique angle to ensure that the paper to be cut is guided into an intersection of the blade 6 and the paper guiding slot 5 and adheres to the paper guiding slot 5, so that an angle between the paper and the blade 6 can be kept fixed when cutting, making it easier to cut the paper. The barrel 1 is configured with a groove 7 on an inside wall, the groove 7 is positioned with respect to the opening 2 and the barrel 1 is made of elastic materials. The opening 2 on the barrel 1 is configured to engage with the groove 7 to be able to pinch or spread for adapting different outer diameters of paper rolls according to a size of a paper drum. An outer side wall of the barrel 1 is uniformly configured with non-slip fillets 8, which have a straight strip-type pattern to achieve non-slip grip while ensuring slight flexibility of elastic materials.

Referring to FIG. 1 to FIG. 3 again, a locking lug 9 is arranged on a bottom of a side of the detachable base 4, a locking block 10 is arranged on a bottom of the barrel 1, and the locking lug 9 is configured to be fitted with the locking block 10, which facilitates installation and snap-fit of the detachable base 4 and the barrel 1.

When specific use, the removable blade 3 is mounted with the locking lug 9 through the locking block 10, the barrel 1 is sleeved on the paper drum, the barrel 1 is pinched to make it be better adapt to an outer diameter of a paper roll, a paper to be cut is guided into the intersection of the blade 6 and the paper guiding slot 5 and adheres to the paper guiding slot 5, the angle between the paper and the blade 6 is kept fixed when cutting, and the barrel 1 is slid along a cutting direction of a cut paper to cut an appropriate length.

The present disclosure and its embodiments are described above, and such description is not limiting, and what is shown in the accompanying drawings is only some of the embodiments of the present disclosure, and actual structures are not limited thereto. In short, if a person of ordinary skill in the art is inspired by it, without departing from the creative purpose of the present disclosure, and without creatively designing structural modes and embodiments similar to the technical solutions, all of them shall fall within the scope of protection of the present invention.

What is claimed is:

1. A paper cutter, comprising a barrel (1);

wherein the barrel (1) is configured with an opening (2) on one side, and a bottom of the opening (2) is configured to be mounted with a removable blade (3);

wherein the removable blade (3) is composed of a detachable base (4), a paper guiding slot (5) and a blade (6); and wherein the paper guiding slot (5) is configured on a top of the detachable base (4), the blade (6) is mounted on an inside of the paper guiding slot (5) at an oblique angle, and the barrel (1) is configured with a groove (7) on an inside wall.

2. The paper cutter according to claim 1, wherein the groove (7) is positioned with respect to the opening (2) and the barrel (1) is made of elastic materials.

3. The paper cutter according to claim 2, wherein an outer side wall of the barrel (1) is uniformly configured with non-slip fillets (8).

4. The paper cutter according to claim 3, wherein a locking lug (9) is arranged on a bottom of a side of the detachable base (4), a locking block (10) is arranged on a bottom of the barrel (1), and the locking lug (9) is configured to be fitted with the locking block (10).

* * * * *